US011812292B2

(12) United States Patent
Nabeshima et al.

(10) Patent No.: US 11,812,292 B2
(45) Date of Patent: Nov. 7, 2023

(54) WIRELESS LAN COMMUNICATION QUALITY ESTIMATION METHOD, WIRELESS LAN COMMUNICATION QUALITY ESTIMATION SYSTEM, INFORMATION COLLECTION DEVICE, AND WIRELESS LAN COMMUNICATION QUALITY ESTIMATION DEVICE

(71) Applicant: Nippon Telegraph and Telephone Corporation, Tokyo (JP)

(72) Inventors: Masayoshi Nabeshima, Tokyo (JP); Shinya Otsuki, Tokyo (JP); Tomoaki Ogawa, Tokyo (JP); Hiroshi Sakamoto, Tokyo (JP); Makoto Umeuchi, Tokyo (JP); Junichi Iwatani, Tokyo (JP); Hiroyuki Nakamura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 403 days.

(21) Appl. No.: 17/287,718

(22) PCT Filed: Oct. 18, 2019

(86) PCT No.: PCT/JP2019/041194
§ 371 (c)(1),
(2) Date: Apr. 22, 2021

(87) PCT Pub. No.: WO2020/085254
PCT Pub. Date: Apr. 30, 2020

(65) Prior Publication Data
US 2021/0400506 A1     Dec. 23, 2021

(30) Foreign Application Priority Data
Oct. 24, 2018     (JP) .................................. 2018-200428

(51) Int. Cl.
*H04W 24/08*     (2009.01)
*H04W 84/12*     (2009.01)

(52) U.S. Cl.
CPC ............ *H04W 24/08* (2013.01); *H04W 84/12* (2013.01)

(58) Field of Classification Search
CPC ..................................................... H04W 24/08
See application file for complete search history.

(56) References Cited

U.S. PATENT DOCUMENTS 5,517,674 A  *  5/1996  Rune ................. H04W 36/0094
                                                         455/437
2013/0163642 A1*  6/2013  Kizu ..................... H04B 1/715
                                                         375/135

(Continued)

OTHER PUBLICATIONS

[No Author Listed], "Report of the study group on the ideal way of service quality measurement of the Internet," Ministry of Internal Affairs and Communications, Jul. 2015, 254 pages (with English Translation).

*Primary Examiner* — Fahmida S Chowdhury
(74) *Attorney, Agent, or Firm* — Fish & Richardson P.C.

(57) ABSTRACT

There are provided an information collecting device configured to collect a frame A transmitted and received between a wireless LAN base station that is an evaluation target and a wireless LAN terminal subordinate to the wireless LAN base station that is the evaluation target and a frame B transmitted and received between a wireless LAN base station that is a non-evaluation target and a wireless LAN terminal subordinate to the wireless LAN base station that is the non-evaluation target, and extract radio information on communication quality of each of the wireless LAN base stations from a header of a corresponding one of the frames A and B, and a wireless LAN communication quality estimation device configured to acquire, from the wireless (Continued)

LAN base station that is the evaluation target, information on the number of currently connected wireless LAN terminals, acquire, from the information collecting device, the radio information on the communication quality of each of the wireless LAN base stations, and analyze the information to estimate whether the communication quality of the wireless LAN base station that is the evaluation target is good or bad.

8 Claims, 5 Drawing Sheets

(56) References Cited

U.S. PATENT DOCUMENTS

| | | | | |
|---|---|---|---|---|
| 2015/0213396 | A1* | 7/2015 | Iwai | G06V 20/52 |
| | | | | 705/7.15 |
| 2016/0062586 | A1* | 3/2016 | Müller | G09B 7/08 |
| | | | | 715/769 |
| 2017/0180065 | A1* | 6/2017 | Tsukamoto | H04W 4/80 |
| 2018/0089381 | A1* | 3/2018 | Allen | G16H 70/20 |
| 2018/0255349 | A1* | 9/2018 | Onishi | H04N 19/42 |
| 2021/0105630 | A1* | 4/2021 | Ishikura | H04L 5/0048 |

* cited by examiner

| MCS avg | f (MCS avg) |
|---|---|
| 9 | 10 |
| 8 | 9 |
| 7 | 8 |
| 6 | 7 |
| 5 | 6 |
| 4 | 5 |
| 3 | 4 |
| 2 | 3 |
| 1 | 2 |
| 0 | 1 |

| AT ratio | f (AT ratio) |
|---|---|
| 0.0 | 10 |
| 0.1 | 9 |
| 0.2 | 8 |
| 0.3 | 7 |
| 0.4 | 6 |
| 0.5 | 5 |
| 0.6 | 4 |
| 0.7 | 3 |
| 0.8 | 2 |
| 0.9 | 1 |
| 1.0 | 0 |

| Retry | f (Retry) |
|---|---|
| 0.0 | 10 |
| 0.1 | 9 |
| 0.2 | 8 |
| 0.3 | 7 |
| 0.4 | 6 |
| 0.5 | 5 |
| 0.6 | 4 |
| 0.7 | 3 |
| 0.8 | 2 |
| 0.9 | 1 |
| 1.0 | 0 |

| Aggr.avg | f (Aggr.avg) |
|---|---|
| 60-64 | 7 |
| 50-59 | 6 |
| 40-49 | 5 |
| 30-39 | 4 |
| 20-29 | 3 |
| 10-19 | 2 |
| 1-9 | 1 |
| 0 | 0 |

Fig. 4

| AT itf avg | f (AT itf avg) |
|---|---|
| 0.0 | 10 |
| 0.1 | 9 |
| 0.2 | 8 |
| 0.3 | 7 |
| 0.4 | 6 |
| 0.5 | 5 |
| 0.6 | 4 |
| 0.7 | 3 |
| 0.8 | 2 |
| 0.9 | 1 |
| 1.0 | 0 |

| Retry itf | f (Retry itf) |
|---|---|
| 0.0 | 10 |
| 0.1 | 9 |
| 0.2 | 8 |
| 0.3 | 7 |
| 0.4 | 6 |
| 0.5 | 5 |
| 0.6 | 4 |
| 0.7 | 3 |
| 0.8 | 2 |
| 0.9 | 1 |
| 1.0 | 0 |

WIRELESS LAN COMMUNICATION QUALITY ESTIMATION METHOD, WIRELESS LAN COMMUNICATION QUALITY ESTIMATION SYSTEM, INFORMATION COLLECTION DEVICE, AND WIRELESS LAN COMMUNICATION QUALITY ESTIMATION DEVICE

CROSS-REFERENCE TO RELATED APPLICATIONS

This application is a National Stage application under 35 U.S.C. § 371 of International Application No. PCT/JP2019/041194, having an International Filing Date of Oct. 18, 2019, which claims priority to Japanese Application Serial No. 2018-200428, filed on Oct. 24, 2018. The disclosure of the prior application is considered part of the disclosure of this application, and is incorporated in its entirety into this application.

TECHNICAL FIELD

The present invention relates to a wireless LAN communication quality estimation method, a wireless LAN communication quality estimation system, an information collecting device, and a wireless LAN communication quality estimation device for estimating communication quality of a wireless LAN.

BACKGROUND ART

Communication speed is commonly used as a communication quality evaluation index for a wireless LAN (Non Patent Literature 1). As illustrated in FIG. 6, in a wireless LAN to which a wireless LAN base station 51 and wireless LAN terminals 52 are connected, a communication speed measurement site 53 connected to the wireless LAN base station 51 is utilized to measure the download time of a measurement frame transmitted from the wireless LAN base station 51 to each wireless LAN terminal 5. If the download time is short, indicating that the communication speed is high, the communication quality of the wireless LAN is estimated to be "good". If the download time is long, indicating that the communication speed is low, the communication quality of the wireless LAN is presumed to be "bad".

CITATION LIST

Non Patent Literature

Non Patent Literature 1: Ministry of Internal Affairs and Communications, "Research Group for Proper Internet Services Quality Metrology, etc.", http://www.soumu.go.jp/menu news/s-news/01kiban0402000095.html

SUMMARY OF THE INVENTION

Technical Problem

In the wireless LAN communication quality estimation method in the related-art illustrated in FIG. 6, a measurement file is downloaded from the communication speed measurement site to the wireless LAN terminal via the wireless LAN base station. This actually generates traffic, and thus has a problem in that a limited radio band is consumed. Furthermore, the measurement file needs to have a certain size, because accuracy is lost when the measurement file is small. Thus, there is also a problem in that a traffic amount is large. Still furthermore, the communication speed measurement site is on the Internet, and the communication speed in a best effort network such as the Internet is affected by a usage status of other users, meaning that measurement needs to be performed not once but repeatedly. Thus, there is also a problem in that a large load is imposed on the radio band.

An object of the present invention is to provide a wireless LAN communication quality estimation method, a wireless LAN communication quality estimation system, an information collecting device, and a wireless LAN communication quality estimation device with which communication quality of a wireless LAN can be estimated without downloading a measurement file from a communication speed measurement site.

Means for Solving the Problem

According to a first aspect of the present invention, a wireless LAN communication quality estimation system configured to estimate communication quality of a wireless LAN base station that is an evaluation target, by using radio information on the wireless LAN base station that is the evaluation target and a wireless LAN base station that is a non-evaluation target includes an information collecting device configured to collect a frame A transmitted and received between the wireless LAN base station that is the evaluation target and a wireless LAN terminal subordinate to the wireless LAN base station that is the evaluation target and a frame B transmitted and received between the wireless LAN base station that is the non-evaluation target and a wireless LAN terminal subordinate to the wireless LAN base station that is the non-evaluation target, and extract the radio information on communication quality of each of the wireless LAN base stations from a header of a corresponding one of the frames A and B; and a wireless LAN communication quality estimation device configured to acquire, from the wireless LAN base station that is the evaluation target, information on the number of currently connected wireless LAN terminals, acquire, from the information collecting device, the radio information on the communication quality of each of the wireless LAN base stations, and analyze the information to estimate whether the communication quality of the wireless LAN base station that is the evaluation target is good or bad.

In the wireless LAN communication quality estimation system according to the first aspect of the present invention, the information collecting device is configured to extract, from the frame A, information on an MCS value, an air time value, a MAC frame count, a retry frame and extracts, from the frame B, information on an air time value and a retry frame, and transmit the information to the wireless LAN communication quality estimation device, and the wireless LAN communication quality estimation device is configured to estimate whether the communication quality of the wireless LAN base station that is the evaluation target is good or bad, by using an index Fa, an index Fb, and an index Fc, the index Fa being based on the information on the MCS value, the air time value, the MAC frame count, and the retry frame extracted from the frame A, the index Fb being a ratio of the number of currently connected wireless LAN terminals to the maximum number of wireless LAN terminals connectable to the wireless LAN base station that is the evaluation target, the index Fc being based on the information on the air time value and the retry frame extracted from the frame B.

The wireless LAN communication quality estimation device may be further configured to use an average value of the MCS value, an air time ratio of the air time value, an average value of the MAC frame count, and a retry ratio of the retry frame in a predetermined period T.

According to a second aspect of the present invention, a wireless LAN communication quality estimation method of estimating communication quality of a wireless LAN base station that is an evaluation target, by using radio information on the wireless LAN base station that is the evaluation target and a wireless LAN base station that is a non-evaluation target includes: by an information collecting device, collecting a frame A transmitted and received between the wireless LAN base station that is the evaluation target and a wireless LAN terminal subordinate to the wireless LAN base station that is the evaluation target and a frame B transmitted and received between the wireless LAN base station that is the non-evaluation target and a wireless LAN terminal subordinate to the wireless LAN base station that is the non-evaluation target, extracting the radio information on communication quality of each of the wireless LAN base stations from a header of a corresponding one of the frames A and B, and transmitting the radio information to a wireless LAN communication quality estimation device; and by the wireless LAN communication quality estimation device, acquiring, from the wireless LAN base station that is the evaluation target, information on the number of currently connected wireless LAN terminals, acquiring, from the information collecting device, the radio information on the communication quality of each of the wireless LAN base stations, and analyzing the information to estimate whether the communication quality of the wireless LAN base station that is the evaluation target is good or bad.

In the wireless LAN communication quality estimation method according to the second aspect, the information collecting device extracts, from the frame A, information on an MCS value, an air time value, a MAC frame count, a retry frame and extracts, from the frame B, information on an air time value and a retry frame, and transmits the information to the wireless LAN communication quality estimation device, and the wireless LAN communication quality estimation device estimates whether the communication quality of the wireless LAN base station that is the evaluation target is good or bad, by using an index Fa, an index Fb, and an index Fc, the index Fa being based on the information on the MCS value, the air time value, the MAC frame count, and the retry frame extracted from the frame A, the index Fb being a ratio of the number of currently connected wireless LAN terminals to the maximum number of wireless LAN terminals connectable to the wireless LAN base station that is the evaluation target, the index Fc being based on the information on the air time value and the retry frame extracted from the frame B.

The wireless LAN communication quality estimation device may further use an average value of the MCS value, an air time ratio of the air time value, an average value of the MAC frame count, and a retry ratio of the retry frame in a predetermined period T.

According to a third aspect of the present invention, an information collecting device of a wireless LAN communication quality estimation system includes the information collecting device configured to collect radio information on a wireless LAN base station that is an evaluation target and a wireless LAN base station that is a non-evaluation target, and a wireless LAN communication quality estimation device configured to estimate communication quality of the wireless LAN base station that is the evaluation target by using the radio information, wherein the information collecting device is configured to collect a frame A transmitted and received between the wireless LAN base station that is the evaluation target and a wireless LAN terminal subordinate to the wireless LAN base station that is the evaluation target and a frame B transmitted and received between the wireless LAN base station that is the non-evaluation target and a wireless LAN terminal subordinate to the wireless LAN base station that is the non-evaluation target, extract the radio information on communication quality of each of the wireless LAN base stations from a header of a corresponding one of the frames A and B, and output the radio information to the wireless LAN communication quality estimation device.

According to a fourth aspect of the present invention, a wireless LAN communication quality estimation device of a wireless LAN communication quality estimation system includes an information collecting device configured to collect radio information on a wireless LAN base station that is an evaluation target and a wireless LAN base station that is a non-evaluation target, and the wireless LAN communication quality estimation device configured to estimate communication quality of the wireless LAN base station that is the evaluation target by using the radio information, wherein the wireless LAN communication quality estimation device is configured to acquire, from the wireless LAN base station that is the evaluation target, information on the number of currently connected wireless LAN terminals, acquire, from the information collecting device, the radio information on communication quality of each of the wireless LAN base stations, and analyze the information to estimate whether the communication quality of the wireless LAN base station that is the evaluation target is good or bad.

Effects of the Invention

With the present invention, an information collecting device collects radio frames of a wireless LAN base station that is an evaluation target (managed by the own company) and a wireless LAN base station that is a non-evaluation target (not managed by the own company) in the periphery of the evaluation target, extracts radio information from each of the radio frames, and transmits the radio information to a wireless LAN communication quality estimation device. The wireless LAN communication quality estimation device calculates a quality index of the wireless LAN base station that is the evaluation target based on the radio information, and thus can estimate the communication quality of the wireless LAN base based on the index.

BRIEF DESCRIPTION OF DRAWINGS

FIG. 4 is a diagram illustrating a relationship between a function value and each parameter of a wireless LAN base station that is an evaluation target.

DESCRIPTION OF EMBODIMENTS

Figure 1:
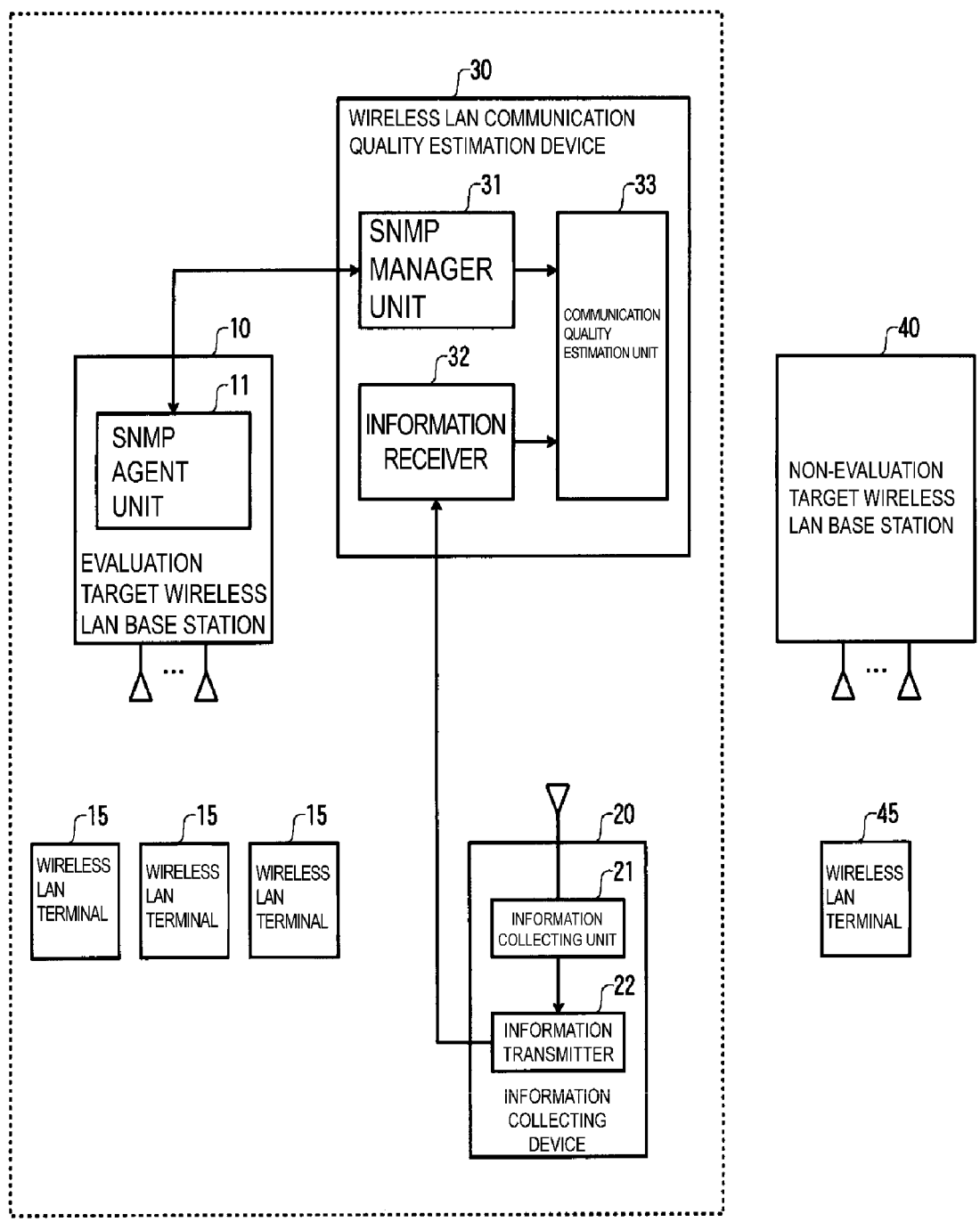
FIG. 1 is a diagram illustrating a configuration example of a wireless LAN communication quality estimation system according to the present invention.

FIG. 1 illustrates a configuration example of a wireless LAN communication quality estimation system according to the present invention.

In FIG. 1, the wireless LAN communication quality estimation system according to the present invention includes a wireless LAN base station 10, wireless LAN terminals 15 subordinate thereto, an information collecting device 20, and a wireless LAN communication quality estimation device 30 connected to the wireless LAN base station 10 and the information collecting device 20. When the wireless LAN base station 10 connected to the wireless LAN communication quality estimation device 30 is an evaluation target (for example, managed by the own company), there is also a wireless LAN base station 40 that is a non-evaluation target (for example, not managed by the own company) not connected to the wireless LAN communication quality estimation device 30 as well as a wireless LAN terminal 45 subordinate thereto. The information collecting device 20 collects a 802.11 frame A transmitted and received between the wireless LAN base station 10 that is the evaluation target and each wireless LAN terminal 15, as well as a 802.11 frame B transmitted and received between the wireless LAN base station 40 that is the non-evaluation target and the wireless LAN terminal 45.

The wireless LAN base station 10 includes a simple network management protocol (SNMP) agent unit 11 that monitors wireless LAN communication devices using SNMP. The SNMP agent unit 11 transmits information requested from the SNMP manager unit 31 of the wireless LAN communication quality estimation device 30 to the wireless LAN communication quality estimation device 30. Note that a function or the like with which the wireless LAN base station 10 communicates with the subordinate wireless LAN terminals 15 is omitted.

The information collecting device 20 includes an information collecting unit 21 and an information transmitter 22. The information collecting unit 21 collects the 802.11 frame A of a designated channel transmitted and received between the wireless LAN base station 10 that is the evaluation target and each wireless LAN terminal 15, and the 802.11 frame B of a designated channel transmitted and received between the wireless LAN base station 40 that is the non-evaluation target and the wireless LAN terminal 45. Then, the information collecting unit 21 extracts predetermined radio information from each of the frames, and transmits the radio information to the wireless LAN communication quality estimation device 30 from the information transmitter 22.

The wireless LAN communication quality estimation device 30 includes the SNMP manager unit 31, an information receiver 32, and a communication quality estimation unit 33. The SNMP manager unit 31 receives information transmitted from the SNMP agent unit 11 of the wireless LAN base station 10, and transmits the information to the communication quality estimation unit 33. The information receiver 32 receives the radio information extracted from each frame and transmitted by the information collecting device 20, and transmits the radio information to the communication quality estimation unit 33. As described later, the communication quality estimation unit 33 calculates an access point quality index (APQI) indicating communication quality of the wireless LAN base station based on each information received, and estimates the communication quality of the wireless LAN on the basis of a value of the index.

As to the wireless LAN base station 10 that is the evaluation target illustrated in FIG. 1, the channel 36 is used, the maximum number of connectable terminals is 128, and three wireless LAN terminals 15 are currently connected. As to the wireless LAN base station 40 that is the non-evaluation target illustrated in FIG. 1, the channel 36 is also used, the maximum number of connectable terminals is 128, and one wireless LAN terminal 45 is currently connected. The information collecting device 20 collects the 802.11 frames of the wireless LAN base station 10 that is the evaluation target and the wireless LAN base station 40 that is the non-evaluation target using the channel 36, and acquires the radio information on the communication quality described in each frame header.

The APQI in the wireless LAN base station 10 is defined as follows.

$APQI = f(Fa, Fb, Fc)$ $Fa = f(MCS\ avg) + f(AT\ ratio) + f(Retry) + f(Aggr.\ avg)$ $Fb = NUMcur/NUMmax$ $Fc = f(AT\ itf\ ratio) + f(Retry\ itf)$ Fa represents an index determined from the radio information on the wireless LAN base station 10 that is the evaluation target. MCS avg represents an average value of the modulation and coding scheme (MCS) included in the 802.11 frames transmitted and received in a period T by the wireless LAN terminals 15 belonging to the wireless LAN base station 10 that is the evaluation target. AT ratio represents an air time ratio of the wireless LAN base station 10 that is the evaluation target in the period T. Retry represents a retry ratio for the 802.11 frames transmitted and received in the period T, by all the wireless LAN terminals 15 belonging to the wireless LAN base station 10 that is the evaluation target. Aggr. (Aggregation) avg represents an average value of the MAC frame count included in the 802.11 frames transmitted and received in the period T by all the wireless LAN terminals belonging to the wireless LAN base station 10 that is the evaluation target.

Note that, f (MCS avg), f (At ratio), f (Retry), and f (Aggr. avg) are function values uniquely determined based on the respective values, and their examples are illustrated in FIG. 4. The topmost values each indicate the best communication quality. Their maximum values are 10, 10, 10, and 7, and thus the maximum value of Fa is 37.

Fb represents a ratio of NUMcur to NUMmax (NUMcur/NUMmax). NUMcur is the number of wireless LAN terminals 15 belonging and currently connected to the wireless LAN base station 10 that is the evaluation target. NUMmax is the maximum number of terminals connectable to the wireless LAN base station 10 that is the evaluation target. The minimum value indicating the best communication quality is 0, and the maximum value indicating the worst communication quality is 1. The ratio is 3/128 in the example illustrated in FIG. 1.

Furthermore, Fc represents an index determined from the radio information on the wireless LAN base station 40 that is the non-evaluation target and uses the same channel as that of the wireless LAN base station 10 that is the evaluation target. AT itf ratio represents an air time ratio of the wireless LAN base station 40 that is the non-evaluation target in the period T. Retry itf represents a retry ratio for the 802.11 frames transmitted and received in the period T, by all the wireless LAN terminals 45 belonging to the wireless LAN base station 40 that is the non-evaluation target.

Figures 5, 6:
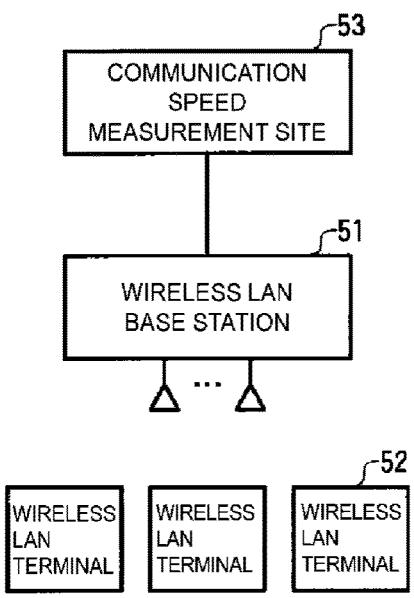
FIG. 5 is a diagram illustrating a relationship between a function value and each parameter of a wireless LAN base station that is a non-evaluation target.
FIG. 6 is a diagram illustrating a configuration example of a wireless LAN communication quality estimation system in a related-art.

Note that f (AT itf ratio) and f (Retry itf) are function values uniquely determined based on the respective values, and their examples are illustrated in FIG. 5. The topmost values each indicate the best communication quality. Their maximum values are 10 and 10, and thus the maximum value of Fc is 20.

Figure 2:
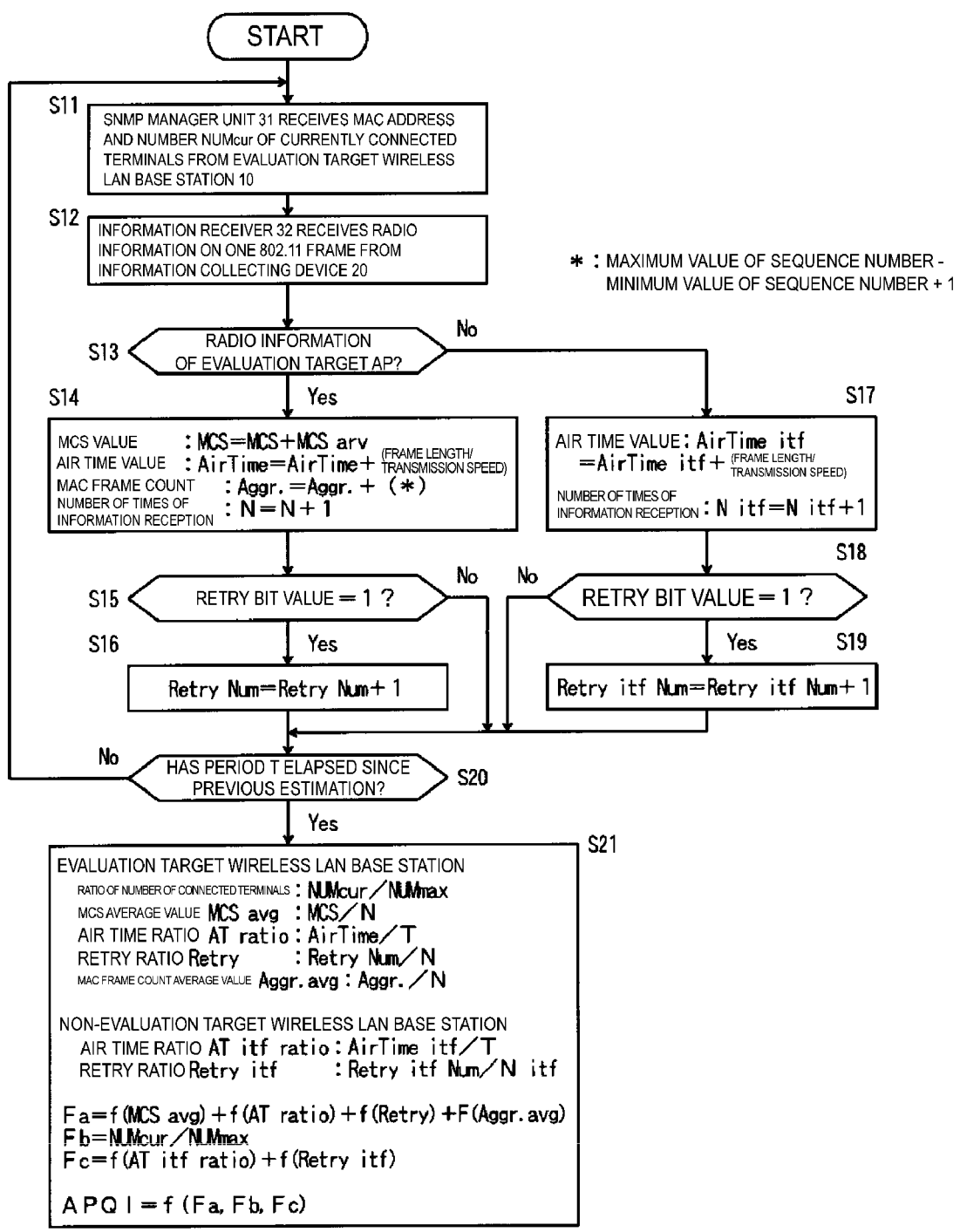
FIG. 2 is a flowchart illustrating an example of a procedure of information processing executed by a wireless LAN communication quality estimation device 30.

FIG. 2 illustrates an example of a procedure of information processing executed by the wireless LAN communication quality estimation device 30.

In FIG. 2, the SNMP manager unit 31 of the wireless LAN communication quality estimation device 30 uses SNMP to acquire a BSSID value (MAC address) of the wireless LAN base station 10 that is the evaluation target and the number NUMcur of currently connected wireless LAN terminals 15 (3 in this example) (S11). The maximum number NUMmax of connectable terminals (128 in this example) is a fixed value, and thus a network administrator sets this value in the wireless LAN communication quality estimation device 30 in advance.

Upon collecting one 802.11 frame, the information collecting device 20 extracts the MAC address, the MAC value, the MCS value, the frame length, the transmission speed, the retry bit value, and the maximum and the minimum values of the sequence number of the MAC frames aggregated, which are in the header, and transmits these pieces of information to the wireless LAN communication quality estimation device 30. The information receiver 32 of the wireless LAN communication quality estimation device 30 receives this radio information (S12).

The communication quality estimation unit 33 checks whether the MAC address of the radio information on the 802.11 frame received from the information collecting device 20 matches the MAC address of the wireless LAN base station 10 that is the evaluation target (S13). When the addresses match, the radio information is determined to be radio information on the wireless LAN base station 10 that is the evaluation target. When the addresses do not match, the radio information is determined to be radio information on the wireless LAN base station 40 that is the non-evaluation target.

Upon determining that the 802.11 frame received is radio information on the wireless LAN base station 10 that is the evaluation target (S13, Yes), the communication quality estimation unit 33 adds up the MCS value MCS, the air time value AirTime, and the MAC frame count Aggr., which are described in each 802.11 frame of the evaluation target, and the number N of times of the information reception (S14). That is, the communication quality estimation unit 33 adds the current MCS value (MCS arv) to the integrated value (MCS) of the MCS values up to the previous time. Furthermore, the communication quality estimation unit 33 adds the current air time value (frame length/transmission speed) to the integrated value (AirTime) of the air time values up to the previous time. Furthermore, the communication quality estimation unit 33 adds the current MAC frame count (the value obtained by subtracting the minimum value of the sequence number from the maximum value of the sequence number and incrementing the resultant value by one) to the integrated value (Aggr.) of the MAC frame counts up to the previous time, and increments the integrated value N of the number of times of information reception up to the previous time by one. When the retry bit value acquired is 1 indicating a retransmitted frame (S15), the integrated value of the retry count Retry Num is obtained (S16). In other words, the integrated value (Retry Num) of the retry count up to the previous time is incremented by one.

On the other hand, upon determining that the 802.11 frame received is radio information on the wireless LAN base station 40 that is the non-evaluation target (S13, No), the communication quality estimation unit 33 adds up the air time value AirTime itf described in the 802.11 frame of the non-evaluation target and the number N itf of times of the information reception (S17). Specifically, the communication quality estimation unit 33 adds the current air time value (frame length/transmission speed) to the integrated value (AirTime itf) of the air time values up to the previous time and increments the integrated value N itf of the number of times of reception up to the previous time by one. When the retry bit value acquired is 1 indicating a retransmitted frame (S18), the integrated value of the retry count Retry itf Num is obtained (S19). In other words, the integrated value (Retry itf Num) of the retry count up to the previous time is incremented by one.

The communication quality estimation unit 33 determines whether the period T has elapsed since the previous quality estimation (S20), and adds up the respective values until the period T elapses. When the period T elapses, the communication quality estimation unit 33 obtains the ratio (NUMcur/NUMmax) of the number of terminals currently connected to the wireless LAN base station 10 that is the evaluation target, the MCS average value (MCS avg=MCS/N) when the number of times of reception is N, the air time ratio (AT ratio=AirTime/T) in the period T, as well as the retry ratio (Retry=Retry Num/N) and the average MAC frame count (Aggr. avg=Aggr./N) when the number of times of reception is N. Furthermore, the communication quality estimation unit 33 calculates the air time ratio (AT itf ratio=AirTime itf/T) of the wireless LAN base station 40 that is the non-evaluation target in the period T and the retry ratio (Retry itf=Retry itf Num/N itf) when the number of times of reception is N itf, and calculates the APQI (S21). Here, the communication quality estimation unit 33 resets the integrated values.

The values in the period T (the number of times of reception is N) are assumed to be as follows.

MCS avg=7
AT ratio=0.3
Retry=0.1
Aggr. avg=25
AT itf ratio=0.1
Retry itf=0.1
NUMcur=3
NUMmax=128

Under this condition, Fa, Fb, and Fc of the APQI are calculated as follows through substitution with the function values in FIGS. 4 and 5.

$$Fa = f(MCS\ avg) + f(AT\ \text{ratio}) + f(\text{Retry}) + f(Aggr.\ avg)$$
$$= 8 + 7 + 9 + 3$$
$$= 27$$

$$Fb = NUMcur / NUMmax$$
$$= 3/128$$
$$= 0.02$$

-continued $$Fc = f(AT \text{ itf ratio}) + f(\text{Retry itf})$$
$$= 9 + 9$$
$$= 18$$

Figure 3:
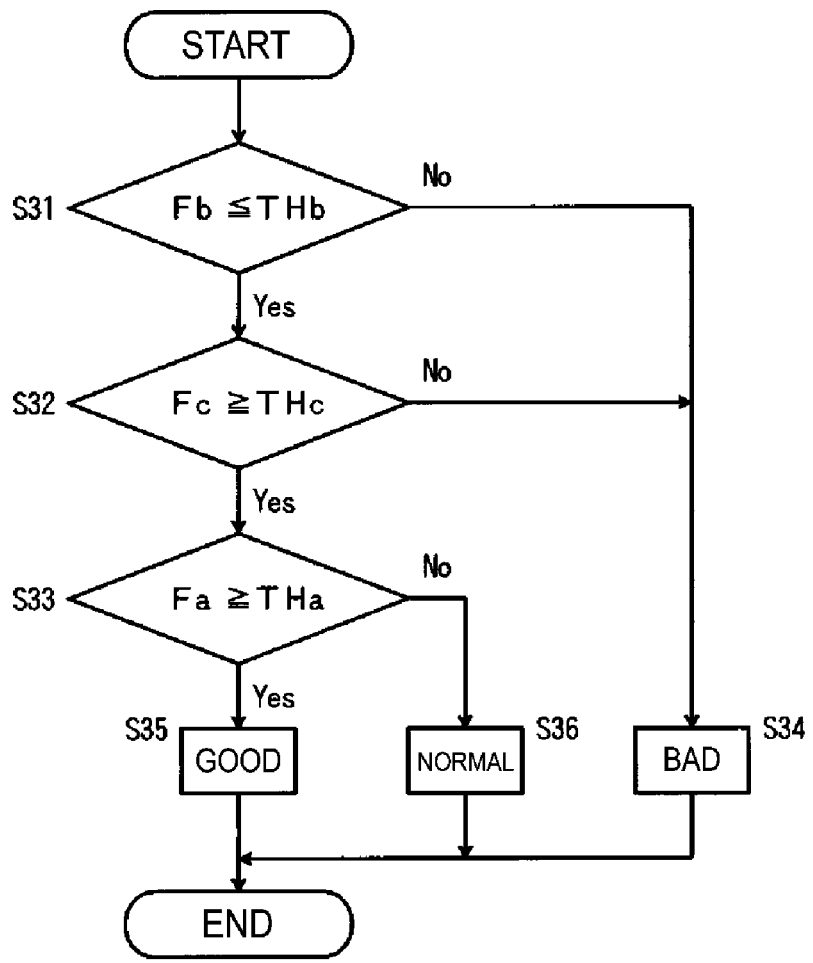
FIG. 3 is a flowchart illustrating an example of a procedure of quality evaluation by the wireless LAN communication quality estimation device 30.

Based on the above calculations, the communication quality estimation unit 33 evaluates the wireless LAN communication quality through the quality evaluation procedure illustrated in FIG. 3. The maximum value of Fa indicating the best communication quality is 37, and a threshold THa for determining that the wireless LAN communication quality is "good" is defined as 20 which is larger than one half of the maximum value 37, for example. The values of Fb indicating the best and the worst communication qualities are 0 and 1 respectively, and a threshold THb for determining that the wireless LAN communication quality is "good" is defined as 0.4 that is smaller than one half of the maximum value, for example. The maximum value of Fc indicating the best communication quality is 20, and a threshold THc for determining that the wireless LAN communication quality is "good" is defined as 12 which is larger than one half of the maximum value 20, for example.

In FIG. 3, the communication quality estimation unit 33 determines whether Fb≤THb (S31), and determines that the quality is "bad" (S34) when the result is No. When the result is Yes, the communication quality estimation unit 33 determines whether Fc≥THc (S32), and determines that the quality is "bad" (S34) when the result is No. When the result is Yes, the communication quality estimation unit 33 determines whether Fa≥THa (S33), and determines that the quality is "good" (S35) when the result is Yes and determines that the quality is "normal" when the result is No.

In the above example, the wireless LAN communication quality is determined to be "good" because of the following relationships.

$$Fb=0.02<THb=0.4$$

$$Fc=18>THc=12$$

$$Fa=27>THa=20$$

REFERENCE SIGNS LIST

10 Evaluation target wireless LAN base station
11 SNMP agent unit
15 Wireless LAN terminal
20 Information collecting device
21 Information collecting unit
22 Information transmitter
30 Wireless LAN communication quality estimation device
31 SNMP manager unit
32 Information receiver
33 Communication quality estimation unit
40 Non-evaluation target wireless LAN base station
45 Wireless LAN terminal

The invention claimed is:

1. A wireless LAN communication quality estimation system configured to estimate communication quality of a wireless LAN base station that is an evaluation target, by using radio information on the wireless LAN base station that is the evaluation target and a wireless LAN base station that is a non-evaluation target, the wireless LAN communication quality estimation system comprising:
an information collecting device configured to collect a frame A transmitted and received between the wireless LAN base station that is the evaluation target and a wireless LAN terminal subordinate to the wireless LAN base station that is the evaluation target and a frame B transmitted and received between the wireless LAN base station that is the non-evaluation target and a wireless LAN terminal subordinate to the wireless LAN base station that is the non-evaluation target, and extract the radio information on communication quality of each of the wireless LAN base stations from a header of a corresponding one of the frames A and B; and
a wireless LAN communication quality estimation device configured to acquire, from the wireless LAN base station that is the evaluation target, information on a number of currently connected wireless LAN terminals, acquire, from the information collecting device, the radio information on the communication quality of each of the wireless LAN base stations, and analyze the information to estimate whether the communication quality of the wireless LAN base station that is the evaluation target is good or bad.

2. The wireless LAN communication quality estimation system according to claim 1, wherein
the information collecting device is configured to extract, from the frame A, information on an MCS value, an air time value, a MAC frame count, a retry frame and extracts, from the frame B, information on an air time value and a retry frame, and transmit the information to the wireless LAN communication quality estimation device, and
the wireless LAN communication quality estimation device is configured to estimate whether the communication quality of the wireless LAN base station that is the evaluation target is good or bad, by using an index Fa, an index Fb, and an index Fc, the index Fa being based on the information on the MCS value, the air time value, the MAC frame count, and the retry frame extracted from the frame A, the index Fb being a ratio of the number of currently connected wireless LAN terminals to the maximum number of wireless LAN terminals connectable to the wireless LAN base station that is the evaluation target, the index Fc being based on the information on the air time value and the retry frame extracted from the frame B.

3. The wireless LAN communication quality estimation system according to claim 2, wherein
the wireless LAN communication quality estimation device is configured to use an average value of the MCS value, an air time ratio of the air time value, an average value of the MAC frame count, and a retry ratio of the retry frame in a predetermined period T.

4. A wireless LAN communication quality estimation method of estimating communication quality of a wireless LAN base station that is an evaluation target, by using radio information on the wireless LAN base station that is the evaluation target and a wireless LAN base station that is a non-evaluation target, the wireless LAN communication quality estimation method comprising:
by an information collecting device, collecting a frame A transmitted and received between the wireless LAN base station that is the evaluation target and a wireless LAN terminal subordinate to the wireless LAN base station that is the evaluation target and a frame B transmitted and received between the wireless LAN base station that is the non-evaluation target and a wireless LAN terminal subordinate to the wireless LAN base station that is the non- evaluation target, extracting the radio information on communication quality of each of the wireless LAN base stations from a header of a corresponding one of the frames A and B, and transmitting the radio information to a wireless LAN communication quality estimation device; and by the wireless LAN communication quality estimation device, acquiring, from the wireless LAN base station that is the evaluation target, information on a number of currently connected wireless LAN terminals, acquiring, from the information collecting device, the radio information on the communication quality of each of the wireless LAN base stations, and analyzing the information to estimate whether the communication quality of the wireless LAN base station that is the evaluation target is good or bad.

5. The wireless LAN communication quality estimation method according to claim 4, wherein the information collecting device extracts, from the frame A, information on an MCS value, an air time value, a MAC frame count, a retry frame and extracts, from the frame B, information on an air time value and a retry frame, and transmits the information to the wireless LAN communication quality estimation device, and the wireless LAN communication quality estimation device estimates whether the communication quality of the wireless LAN base station that is the evaluation target is good or bad, by using an index Fa, an index Fb, and an index Fc, the index Fa being based on the information on the MCS value, the air time value, the MAC frame count, and the retry frame extracted from the frame A, the index Fb being a ratio of the number of currently connected wireless LAN terminals to the maximum number of wireless LAN terminals connectable to the wireless LAN base station that is the evaluation target, the index Fc being based on the information on the air time value and the retry frame extracted from the frame B.

6. The wireless LAN communication quality estimation method according to claim 5, wherein the wireless LAN communication quality estimation device uses an average value of the MCS value, an air time ratio of the air time value, an average value of the MAC frame count, and a retry ratio of the retry frame in a predetermined period T.

7. The wireless LAN communication quality estimation system according to claim 1, wherein:

the information collecting device is configured to collect the radio information on the wireless LAN base station that is the evaluation target and the wireless LAN base station that is the non-evaluation target; and the wireless LAN communication quality estimation device is configured to estimate communication quality of the wireless LAN base station that is the evaluation target by using the radio information, wherein the information collecting device is configured to collect the frame A transmitted and received between the wireless LAN base station that is the evaluation target and the wireless LAN terminal subordinate to the wireless LAN base station that is the evaluation target and the frame B transmitted and received between the wireless LAN base station that is the non-evaluation target and the wireless LAN terminal subordinate to the wireless LAN base station that is the non-evaluation target, extract the radio information on the communication quality of each of the wireless LAN base stations from the header of the corresponding one of the frames A and B, and output the radio information to the wireless LAN communication quality estimation device.

8. A wireless LAN communication quality estimation device of a wireless LAN communication quality estimation system comprising:

an information collecting device configured to collect radio information on a wireless LAN base station that is an evaluation target and a wireless LAN base station that is a non-evaluation target: and the wireless LAN communication quality estimation device configured to estimate communication quality of the wireless LAN base station that is the evaluation target by using the radio information, wherein the wireless LAN communication quality estimation device is configured to acquire, from the wireless LAN base station that is the evaluation target, information on a number of currently connected wireless LAN terminals, acquire, from the information collecting device, the radio information on communication quality of each of the wireless LAN base stations, and analyze the information to estimate whether the communication quality of the wireless LAN base station that is the evaluation target is good or bad.

* * * * *